Dec. 12, 1939.　　　　　L. S. BURGETT　　　　　2,183,473
WELDING APPARATUS
Filed Feb. 23, 1937　　　　　3 Sheets-Sheet 1

INVENTOR
Lynn S. Burgett
BY
Warren H. F. Schmieding
ATTORNEY

Dec. 12, 1939.    L. S. BURGETT    2,183,473
WELDING APPARATUS
Filed Feb. 23, 1937    3 Sheets-Sheet 3

INVENTOR
Lynn S. Burgett,
BY
ATTORNEY

Patented Dec. 12, 1939

2,183,473

UNITED STATES PATENT OFFICE 2,183,473

WELDING APPARATUS

Lynn S. Burgett, Euclid, Ohio, assignor to Una Welding, Inc., East Cleveland, Ohio, a corporation of Delaware Application February 23, 1937, Serial No. 127,038

12 Claims. (Cl. 219—8)

My invention relates to welding systems and more particularly to the electrical controls and circuits therefor as used in such systems.

One of the objects of my present invention is to provide a welding machine and an electrical control circuit therefor which is sufficiently flexible to operate from a constant potential welding generator or from an auxiliary motor generator set, in the event that a variable voltage welding generator is employed.

A further object is to provide an electrical control circuit for a welding machine, which circuit includes an arc regulating resistance and control means therefor, said resistance being variable to a plurality of adjustable positions, which when adjusted to proper resistance regulation, will automatically be varied by the control means to change the resistance, and the dependent electrode feed, in accordance with the welding operation being performed.

A still further object is to provide one or both of the motors of the electrode feeding mechanism with a friction brake to prevent excessive coasting of the feeding mechanism after the machine has been deenergized; thus limiting the retraction of the electrode and substantially bringing the same to a definite position of rest.

The welding machine or head utilized in my present invention is substantially similar in construction to the head described in copending application Serial No. 715,869, now Patent No. 2,079,956, dated May 11, 1937, assigned to the assignee of the present invention. This type of head employs two motors for controlling the feeding of the electrode toward the work to be welded. These motors rotate in opposite directions and at different speeds. The motors are connected by differential gearing to produce a resultant movement of the electrode in one direction. The motor which tends to feed the wire downwardly is generally termed the "down" motor while the other motor is termed the "up" motor.

In the preferred form of my present invention a motor 27, of constant speed characteristics, is employed as the up motor. The motor 27 may be either an A. C. or a D. C. motor of the constant speed type. The motor 27 rotates, for example, at a speed of 1750 R. P. M. A second motor 29, generally referred to as the down motor, rotates at a normal speed of, for example, 2050 R. P. M. The motor 29 is a D. C. compound wound motor whose speed may be varied, within limits, by the voltage applied to the series field and armature circuit. The design of this motor is such that, essentially, the speed in revolutions per minute is directly proportional to the voltage when operated with a constant shunt field voltage as it is in this invention. The motors 27 and 29 are connected by a differential 31, which differential produces a normal resultant downward electrode feed equal to the burning rate of the electrode for the conditions of the welding being done. Due to the variable speed characteristics of the down motor 29 the electrode is fed at varying rates, within limits, to maintain substantially constant arc characteristics.

Figure 1:
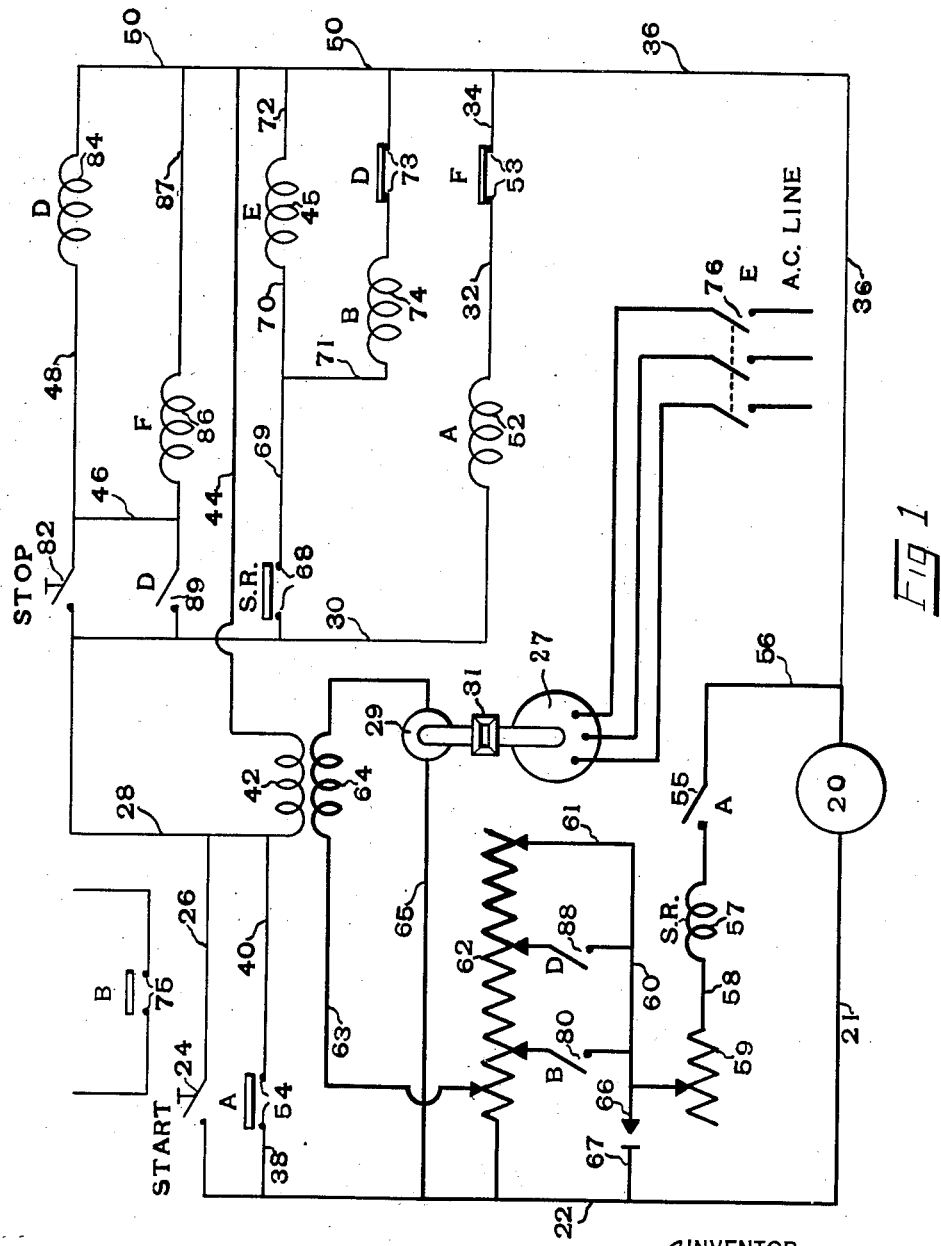
Fig. 1 is a simplified diagram of a welding system showing the circuit utilized in connection with a constant potential welding generator.

Fig. 1 shows a wiring diagram of the control circuit for a welding head using current as supplied by a constant potential welding generator 20. The diagram is of a simplified type and coils and contacts of like letters are understood to be associated electro-responsive mechanisms.

Referring to the diagram, current for the D. C. portion of the circuit is supplied by the constant potential welding generator 20. Wires 21 and 22 connect the generator to a starting switch 24. Momentary closure of switch 24 causes current to flow through wire 26, shunt field 42 of motor 29, wires 44, 50 and 36 to the generator 20. Closing the starting switch also allows current to pass through wires 26, 28, 30 coil 52 of contactor A, wire 32, contacts 53 of contactor F, wires 34 and 36 to the generator 20. Current passing through coil 52 of contactor A causes contacts 54 of contactor A to close to establish a holding circuit around the starting switch 24, through wire 38 contacts 54, wire 40, shunt field 42 of motor 29, wires 44, 50 and 36 to the generator 20. Energizing coil 52, of contactor A, also closes contacts 55 to establish a circuit including generator 20, wire 56 contacts 55, series relay coil 57, wire 58, resistance 9, wires 60 and 61, resistance 62, wire 63, series field 64 of motor 29, armature of motor 29, wires 65, 22 and 21 to the other side of the generator 20. Energization of the series field 64 starts the operation of the D. C. motor 29, since its shunt field 42 has already been energized. Rotation of the D. C. motor 29, which is the down motor, feeds an electrode 66 toward the work 67 to be welded. The electrode 66 is connected to one side of the generator 20, through resistance 59, wire 58, relay coil 57, contacts 55 and wire 56, while the work 67 is connected by wires 21 and 22 to the other side of generator 20.

The initial passage of electrical energy through series relay coil 57 does not affect the relay since no appreciable current is passing through the coil. However as soon as the electrode 66 touches the work 67 a heavy current passes through the circuit and there is a marked reduction in voltage impressed at the arc regulating resistance 62, due to the voltage drop in resistance 59, which causes the series connected motor 29 to slow down; simultaneously the high current traverses the relay coil 57 to cause contacts 68 to close which allows current from wire 30 to flow through contacts 68 and wire 69. At this point the current divides. One division of the current passes through wire 70, coil 45 of contactor E, wires 72, 50, and 36 to the generator 20. Energizing coil 45 of contactor E causes its contacts 76 to close to complete the circuit from the A. C. line to the up motor 27, which starts the up motor. The other division of the current passes through wire 71 coil 74 of contactor B, through closed contacts 73 of contactor D to wire 36 and back to the generator 20. Energization of coil 74 of contactor B closes contacts 75 which control any external operating circuit, for example, mechanism to move the welding table and also closes contacts 80 which changes the resistance on the arc regulating resistance to speed up the down motor 29.

Thus, when the up motor 27 is started, its speed exceeds the speed of the down motor which has been decelerated due to the voltage drop in the circuit caused by the electrode touching the work, this allows the electrode to be retracted from the work, to strike an arc. As the arc is struck, the arc voltage increases across the arc and the arc regulating resistance 62. Since any variation in arc voltage has a corresponding effect on the speed of the down motor, it is apparent that as the arc is struck and the voltage in the circuit increases the down motor 29 speeds up which maintains an equilibrium condition at the arc. All of the described reactions take place substantially simultaneously to place the system in operating condition.

During subsequent operation of the system the variations in burning rate of the electrode are compensated for by the variation in speed of the down motor 29 to maintain an arc, at all times, of substantially constant length and characteristics.

In order to stop the operation of the system, a stop button 82 is provided. By depressing the stop button 82 a circuit is established which energizes coils 84 and 86 of contactors D and F respectively through wires 46, 48, 87 and wires 50 and 36 back to the generator 20. The energization of coil 84 of contactor D opens the contacts 73 which breaks the circuit through contactor B, and causes its contacts 75 and 80 to separate. Simultaneously a holding circuit through contacts 89 of contactor D is established around the stop button 82. Contactor D likewise closes its contacts 88 to throw more resistance in series with the down motor 29 to decelerate the same. This action slows down the rate of feed of the electrode and allows the electrode 66 to turn back.

Depressing the stop button 82 also energizes coil 86 of contactor F, which is a time delay relay, to subsequently separate contacts 53 of contactor F. This breaks the circuit through coil 52 of contactor A, which opens the contacts 54 and 55 to break the holding circuit around the start button and the arc circuit respectively. Thus the entire system is deenergized, for with the opening of contacts 54, the holding circuit around the stop button 82 is also broken.

Contactor F is of the time delay or time lag type, which upon energization causes a momentary delay before its contacts are actuated. This delay allows the electrode 66 to burn away from the work before deenergization of the motors and thus prevents the electrode from becoming fused to the work.

The present circuit is especially desirable from a manufacturing standpoint, since a constant potential welding generator, such as 20 is not always available. In this case the described circuit may be easily modified to operate from a motor generator set in conjunction with a variable voltage type welding generator. In this modification (see Fig. 2) a motor generator set 100 is utilized, with its driving motor 101 being connected to the A. C. line. A D. C. generator 102, with its shunt field 103, regulating resistance 104 and series field 105, is connected to the control circuit by wires 106 and 107. It will be noted therefore, that by shifting the two wires 22 and 36, as shown in Fig. 1, the circuit is transformed to operate from the motor generator set 100.

The speed regulation of the motor electrode drive must necessarily still depend on the welding circuit since the speed of the down motor 29 is controlled by the series field which is connected directly across the arc and whose voltage, therefore, will vary directly with the arc voltage. Thus the shunt field of the motor 29 is energized by the motor generator set 100 while the series field derives its electrical energy from the generator 20, through the resistance 62 and the arc.

Figure 2:
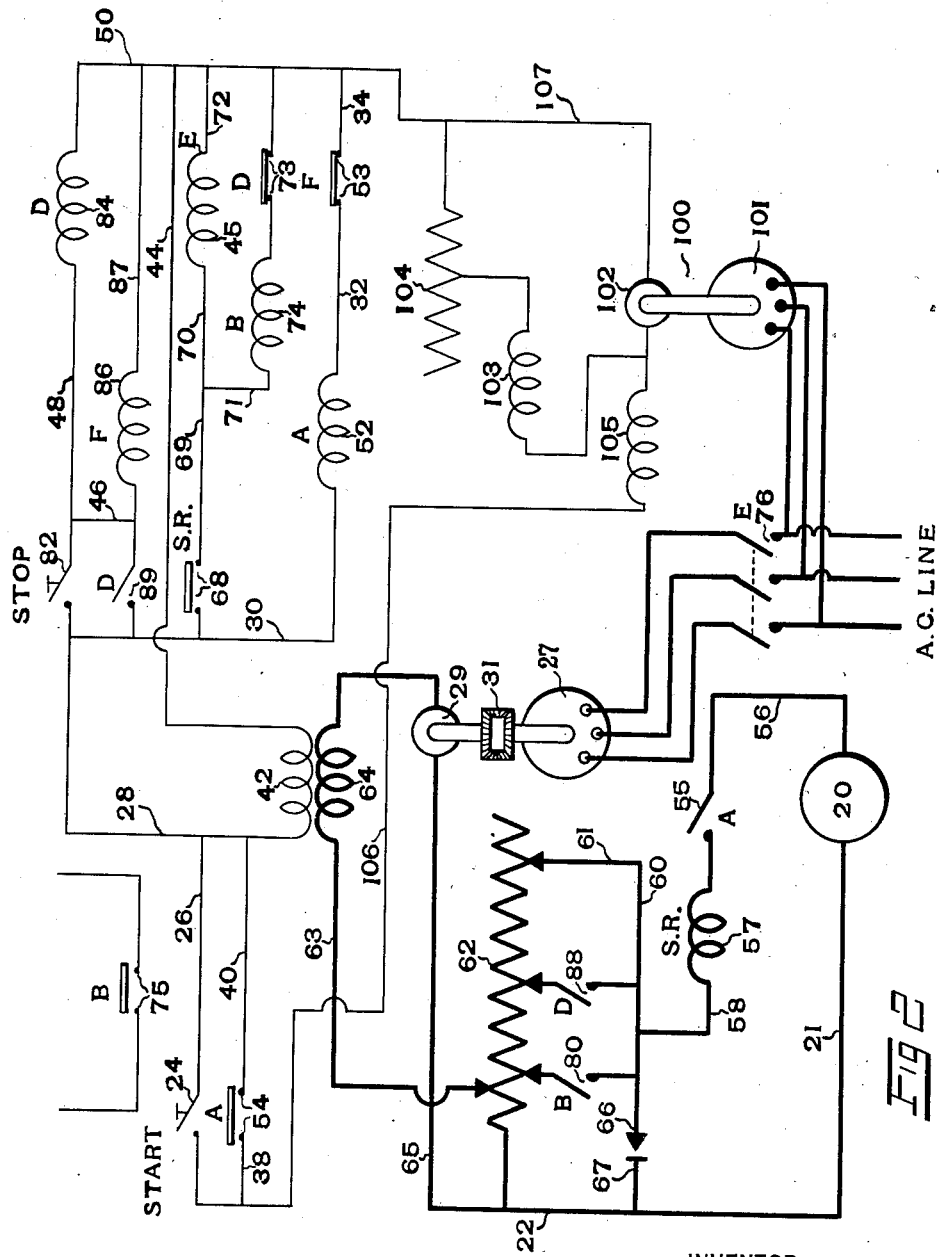
Fig. 2 is a modified wiring diagram of the circuit which is applicable for use with a variable voltage welding generator.
Figure 3:
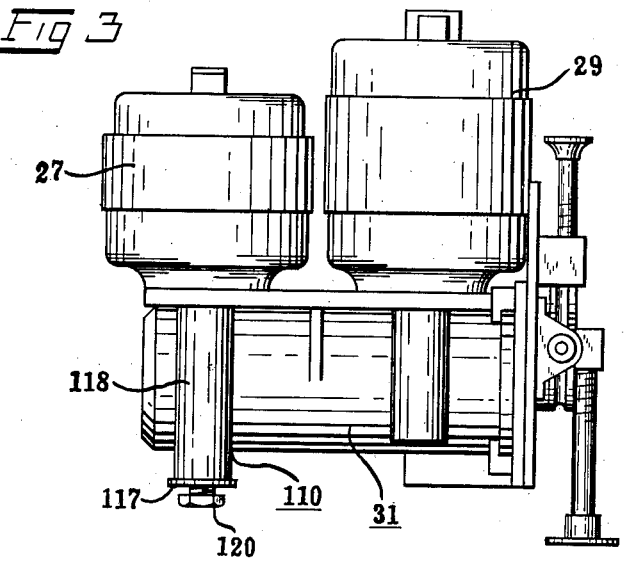
Fig. 3 is a view of the welding head.

In the circuit shown in Fig. 2 the welding current resistance 59 is omitted as it is not required when a variable voltage generator is used.

The arc regulating resistance 62 and its function is an important feature of the described welding systems. This resistance is in effect a potentiometer having its center tap 63 connected to the field 64. It will be noted that when either system is initially placed in operation there is sufficient resistance in circuit with the series field of motor 29 to cause the motor 29 to operate below its rated speed and as the arc is struck and the up motor 27 is started, a portion of this resistance is automatically eliminated, so that the down motor 29 will be accelerated when the up motor 27 starts to maintain a desirable feeding rate. Likewise when the system is being stopped the automatic control increases the resistance in the series field circuit to decelerate the down motor 29 so that the electrode will burn back from the work and eliminate fusing of the electrode to the work.

To prevent the electrode 66 from being retracted too far from the work, after deenergization of the apparatus, a simple friction brake 110 is provided. The brake 110 tends to stop the motors as soon as they are deenergized, rather than allowing them to "coast" due to their rotational momentum. This braking action assures that the electrode will be withdrawn to a substantially definite distance from the work. It is a distinct disadvantage to withdraw the electrode too far from the work, as it requires too much time to get the electrode back into an operating position and if fluxing tape, or the like, is used it may become disengaged from the electrode. Both of these disadvantages are overcome by using the brake 110.

Figure 4:
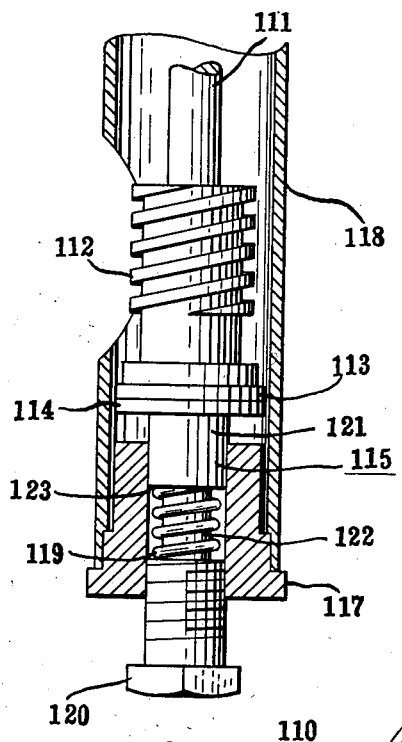
Fig. 4 is a section taken through the shaft housing of the up motor and showing the braking mechanism.

A preferred form of construction for the brake 110 is shown in Fig. 4, as applied to the up motor 27. An elongated shaft 111 of the motor 27 carries a worm gear 112 for engaging the differential gearing 31. The end of the motor shaft 111 is provided with a flat disc 113. A similarly shaped disc 114 is carried by a shaft 115, which shaft is journalled in a bearing 117. The bearing 117 is pressed into and firmly carried by a tubular shaft housing 118. The shaft 115 is of two diameters and the larger diameter 121 thereof is slidable within the bearing 117 to allow longitudinal reciprocal movement. A spring 119 passes over the smaller diameter 122 of the shaft 115 and bears against a shoulder 123 as formed by the large diameter 121. The spring 119 is under compression to constantly urge the shaft 115 inwardly and thereby cause the discs 113 and 114 to engage frictionally at all times. An adjustment screw 120 is accessibly disposed and has its inner end bearing against the spring. The screw may be utilized to change the pressure of the spring 119 on the shaft 115 and thus vary the frictional drag between the discs 113 and 114. The shaft 115 may be suitably keyed in its bearing 117 so as to prevent rotation of the shaft.

It is apparent from the foregoing that the frictional engagement between the two discs may be varied by manipulation of the adjustment screw 120. In this manner the rotational momentum of the motors may be controlled after deenergization to cause the motors to stop within any desired time period. Since the motors 27 and 29 are engaged by gearing, the brake may be applied to either motor but as shown is preferably associated with the up motor.

From the foregoing it will be noted that I have provided a completely automatic welding control apparatus that is sufficiently flexible to be used with either type of welding generator in common use. I have also provided means for controlling the speed of the electrode feed during stopping and starting operations and for controlling the rotational momentum of the feeding mechanism after deenergization.

While the forms of embodiments of the present invention as herein disclosed constitute preferred forms, it is to be understood that other forms might be adopted, all coming within the scope of the claims which follow.

I claim:

1. In a welding system, the combination of a source of potential; a welding electrode, work to be welded; a welding head for feeding the electrode to the work, said head including a motor; and means in series with the motor for causing the motor to operate at a reduced speed until the arc is struck, at which instant the motor is accelerated by the said means to its normal speed, said means causing deceleration of the motor when the system is being stopped prior to deenergization of the system.

2. In a welding system, a pair of electrodes movable towards and away from each other; a motor for causing movement in one direction, said motor having a regulating circuit connected across said electrodes; a separately energized motor for moving the electrodes in the opposite direction; and means operated by the momentary contact of the electrodes for energizing the second mentioned motor.

3. In a welding system, work to be welded; an electrode movable to and from said work and operable to strike an arc with the work; a welding generator for supplying current to the arc and connected across the work and the electrode; a variable speed motor for driving the electrode toward the work, said motor having a regulating circuit connected across the arc; a separately energized motor for retracting the electrode from the work; and means operated by the striking of an arc for energizing the second mentioned motor.

4. A welding system comprising, a welding circuit; an electrode feeding mechanism including a motor having a plurality of circuits; means separate from the welding circuit for supplying electrical energy to one of said motor circuits; a resistance connected across the welding circuit; a second of said motor circuits in circuit with said resistance and control means operable during starting and stopping operations of the system for varying said resistance.

5. A welding system including a welding circuit and source of potential therefor; electrodes in said circuit relatively movable with respect to each other; electrical means for causing relative movement of said electrodes and including a regulating circuit; a resistance connected across said electrodes; said regulating circuit being connected across the said electrodes through the resistance, whereby the rate of movement of the electrodes is dependent on the position of said electrodes and on the value of the said resistance; and means for changing the value of the resistance for obtaining varying rates of movement.

6. A welding system including, a welding circuit and source of potential therefor; electrodes in said circuit relatively movable with respect to each other; electrical means for causing movement of said electrodes and including a regulating circuit; a potentiometer device including a variable resistance drop wire having a fixed intermediate tap, said drop wire being connected across the electrodes and the said potential source, said intermediate tap being connected to the regulating circuit, whereby variation in the resistance of the drop wire causes voltage changes in said regulating circuit; and means operated in a sequence for changing the drop wire resistance during starting and stopping functions respectively of the welding system.

7. A welding system including a welding circuit, a source of potential for the circuit; electrodes in said circuit relatively movable with respect to each other and adapted to strike an arc therebetween, means for producing said movement in one direction, separate electrical means for producing movement in the other direction, said last means including a speed regulating circuit, a variable resistance connected across the electrodes, said regulating circuit being connected across the electrodes through said resistance, whereby variations in the potential at the arc cause variation in the current in the regulating circuit for changing the speed of said second means, and means operable for varying said resistance in accordance with the welding function being performed.

8. A welding system including a welding circuit; a source of potential for the circuit; electrodes in said circuit relatively movable with respect to each other and adapted to strike an arc therebetween; means for producing said movement in one direction; separate electrical means for producing movement in the other direction; said last means including a speed regulating circuit; a variable resistance connected across the electrodes, said regulating circuit being connected across the electrodes through said resistance whereby variations in arc length cause the speed regulating circuit voltage to be increased or decreased to cause the second means to change speed for maintaining a constant length of arc; and means for changing the resistance of said variable resistance for varying the speed of the second mentioned means with respect to the welding function being performed.

9. A welding system comprising in combination, mechanism for feeding welding electrode to the work, said electrode being operable to strike an arc with the work, including a motor of variable speed characteristics; a resistance in circuit with a circuit of said motor; and control means responsive to variations in the potential at the arc struck between said electrode and the work for automatically varying the said resistance during starting operations of the welding machine for changing the speed of said motor.

10. In a welding system; a pair of electrodes; means for moving the electrodes relative to one another including a variable speed electric motor operative to move one of the electrodes toward the other, and a constant speed motor operative to move one of the electrodes away from the other, said motors operating through a differential mechanism; a circuit for said variable speed motor; a circuit for the constant speed motor; and means operable for energizing the constant speed motor when a circuit is completed between said electrodes.

11. In a welding system; a pair of electrodes; means for moving the electrodes relative to one another including a variable speed electric motor operative to move one of the electrodes toward the other, and a constant speed motor operative to move one of the electrodes away from the other, said motors operating through a differential mechanism; a circuit for said variable speed motor; including a resistance in series with a winding of the motor, said resistance being connected across the electrodes; and means for varying the value of the said resistance to change the speed of the variable motor when a circuit is completed between the said electrodes.

12. In a welding system; a pair of electrodes; means for moving the electrodes relative to one another including a variable speed electric motor operative to move one of the electrodes toward the other, and a constant speed motor operative to move one of the electrodes away from the other, said motors operating through a differential mechanism; a circuit for said variable speed motor; including a resistance in series with a winding of the motor, said resistance being connected across the electrodes; and means for varying the value of the said resistance in stopping the welding operation.

LYNN S. BURGETT.